May 22, 1956 J. H. DEBS 2,746,636
MULTIPLE BAKING PAN ASSEMBLY
Filed Feb. 23, 1955

INVENTOR.
JEROME H. DEBS
BY
Ooms McDougall Williams
& Hersh
Atty's

United States Patent Office 2,746,636
Patented May 22, 1956

2,746,636

MULTIPLE BAKING PAN ASSEMBLY

Jerome H. Debs, Chicago, Ill., assignor to Chicago Metallic Manufacturing Company, Ashland, Ill., a corporation of Illinois Application February 23, 1955, Serial No. 490,075

3 Claims. (Cl. 220—23.2)

This invention relates to an improvement in the construction of multiple baking pans joined one to another into a unitary assembly, and it relates more particularly to an improvement in the assembly of such multiple baking pans to provide for a more desirable construction from the standpoint of freedom from elements which might cause the introduction of impurities of contamination of the baked products; which might cause more rapid deterioration of the baking pan assembly; which might cause the presence of elements capable of injury to personnel handling the units in normal use; and which might cause distortions in the baking pan units whereby the products secured from them are unacceptable for commercial sale.

This invention is a continuation-in-part of my copending application Serial No. 293,286, filed June 13, 1952, and entitled "Improvement in Multiple Baking Pan Assemblies."

It is an object of this invention to produce a multiple baking pan assembly which is sturdy in construction, which is free of obstructions or edges from which injury might occur and which eliminates many of the conditions that have heretofore resulted in the contamination of goods baked in the pans or which collects materials which might cause excessive corrosion or rusting of the pans to accelerate the deterioration thereof and which detracts in general from the appearance of the pan.

Another object is to produce a baking pan assembly which can be economically manufactured of metallic sheet stock into a safe and durable structure having improved appearance and operability, and which avoids the existence of pockets or surfaces wherein dirt and other substances causing contamination, corrosion, or excessive wear might collect.

These and other objects and advantages of this invention will hereinafter appear and for purposes of illustration, but not of limitation, an embodiment of this invention is shown in the accompanying drawings, in which—

Figure 1:
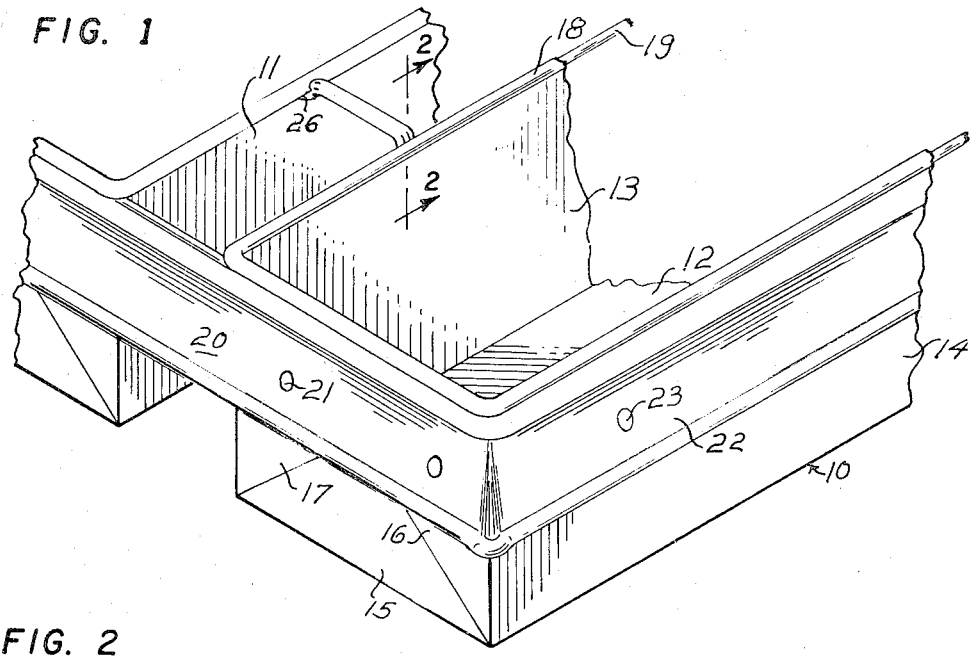
Figure 1 is a perspective elevational view of a portion of a baking pan assembly embodying features of this invention.

In the past, multiple baking pan assemblies of the type described have been bridged with spacers in the form of strips or bands of metal having their broad faces uppermost to secure the pans in a predetermined spaced-apart relation between the side walls with sufficient rigidity to resist relative movement as an incidence to normal use for purposes for which the pans were intended. It was believed necessary to make use of such bridging members formed of flat strips of metal in order to enable the strip to be secured about the reinforcing wires of the pan without causing unattractive bulges in the beads formed about the pan and yet secure sufficient rigidity to effect the desired assembled relation without distortion of the lines of the pan or variation in the spaced relation between the side walls of the pan.

In practice, it has been found that such broad spacer strips have been found to constitute a source of danger because of their relatively acute and sharp edges. From the standpoint of function and operation, considerable objection has been raised to the use of such flat strips and bands because of their interference with the uniform flow of heat upwardly about the side walls of the pan units, with the result that non-uniform baking of the pan content results and an inferior product is produced.

Most important, it has been experienced over a large number of years that the broad flat faces of the spacer strips extending crosswise between the side edges of adjacent pans in the region of the upward end portions thereof provide areas and pockets wherein dirt, dough ingredients and other substances collect during normal baking operations where they are able to function as a source for contamination of the baked goods, where they detract from the cleanliness of the pan and raise sanitary questions, where they retain substances in surface contact with the metal portions of the unit for accelerating collection and deterioration, with the result that the pan assembly becomes insufficient for use in a relatively short time. The presence of such spacer strips has been found not only to interfere with the free use of the pan and to shorten the life thereof, but also to require additional steps and precautions for use in cleaning the pans to remove foreign material which might have become lodged thereon.

Thus it is an object of this invention to produce a multiple baking pan assembly of the type described which is free of sharp edges and which introduces less interference with the flow of heat during the baking operations, and which avoids the formation of areas wherein dirt and the like materials can collect to contaminate the products or impair the appearance of the assembly, but wherein such improvements which are made are incapable of destroying the utility of the assembly or complicating the manufacture thereof.

The invention herein will be described with reference to the manufacture of a multiple baking pan assembly for use in the production of baked goods, wherein the pan units of an elongate form are of substantially rectangular shape in cross-section lengthwise as well as crosswise and formed with side walls all around to limit crust formation chiefly to the top side of the baked product. It will be understood that the inventive concepts may also be adapted for use with other similar constructions for the production of baked goods.

As shown in Figure 1, the baking pan assembly embodying features of this invention may be illustrated by the joinder of two pan units 10 and 11 of substantially identical construction and contour, but preferably in which the pan units of rectangular shape are formed to have a substantial length. These pan units are formed of a flat or strippled sheet of metal shaped into a substantially rectangular structure having a bottom wall 12, side walls 13 and 14 extending upwardly substantially perpendicularly from the bottom wall, and integral end walls 15. The excess metal which remains upon folding of the preformed sheet metal stock to the described shape is lapped over the end walls 15 to provide flaps 16 and 17 which function to increase the strength and rigidity of the structure in a manner which permits economy and simplicity to be practiced in the manufacturing operations.

The upper edge portions of the sheet metal forming the side walls 13 and 14 and the end walls 15 of each baking unit are rolled over to form a rounded bead 18 having a continuous reinforcing wire 19 extending all around the upper edge of each pan unit. In general, the end and side walls are formed with an outward taper from the lower edge toward the top to permit stacking of the units in nesting relation and to permit the baked products to be knocked out in a simple and efficient manner.

The pan units are united into a multiple pan assembly by elongated strips 20 secured, as by rivets 21, to rivet plates which are fixed to the end walls of the pan and by strips 22 fixed by rivets 23 extending lengthwise along the edge of the outermost pans in the unit. The strip members function to reinforce the pan units and to protect the outer walls against injury or deformation resulting from impact and the like, while maintaining the desired rigidity in the pan assembly. For a detailed description of the strip assembly, reference may be made to the Langel Patent No. 2,347,694, issued May 2, 1944.

The improvement which has been made in multiple baking pan assemblies of the type described resides in the employment of a new and novel spacer which is free of the objectionable features that have heretofore characterized bridging members for the past many years and which have been recognized as being highly objectionable in the field. The improved spacers overcome the objectionable features described without impairing the function and operation of the spacers to maintain the desired assembled relation and rigidity and permanence of the spaced relation between the adjacent side walls of the elongate pin units, and without creating problems of assembly. The improved spacers greatly benefit the assembly by improving the appearance of the multiple baking pan unit and by elimination of sources of contamination or injury.

Figure 2:
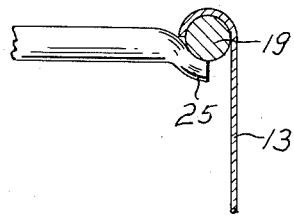
Figure 2 is a fragmentary sectional elevational view taken along the line 2—2 of Figure 1.

In accordance with the practice of this invention, use is made of a rod-like member of substantially circular cross-section formed of a metal wire or the like having a body portion 24 dimensioned to correspond to the spaced relation between the pan units and with the end portions 25 and 26 extending outwardly from the body portions adapted to underlie the reinforcing wire 19 for attachment thereto, as by welding or the like. In the modification illustrated in Figures 1 and 2, the end portions 25 and 26 are deformed to extend downwardly from the body portion a short distance, and the downwardly extending end portions 25 and 26 are flattened so as to provide more substantial engagement for attachment to the under side of the reinforcing wire 19, while the body portion extending crosswise between the pans is at substantially the same level as the beaded portion 18.

The narrow rod-like body portion spanning the side walls of adjacent pan units provides no surfaces which could function as a source of danger or injury, and no areas are available upon which dough, dough ingredients or impurities might collect to detract from the appearance of the assembly or from the cleanliness of the structure, or demand extra precautions for cleaning to remove such impurities, or contaminate the baked product produced in such units. It will be understood that instead of using a spacer in the form of a rod-like member which is circular in cross-section, it is possible to achieve the desired results by the use of a spacer having the body portion which is curvilinearly formed in the upper half thereof, while the bottom side may be formed to a different curvilinear shape or substantially flat.

Figure 3:
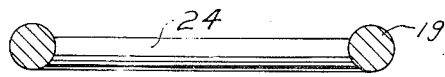
Figure 3 is a sectional view similar to that of Figure 2, illustrating a modification in the construction of the baking pan assembly.

In the modification shown in Figure 3, the body portion extends crosswise at substantially the same level as the reinforcing wire 19, and the end portions are shaped to engage the side walls of the reinforcing wires of the adjacent pans in a manner to enable attachment thereto, as by welding or the like.

Figure 4:
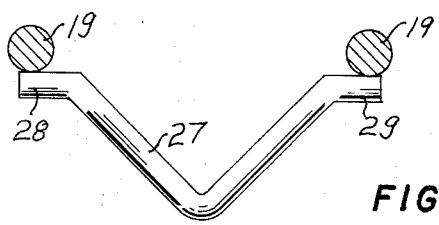
Figure 4 is a sectional elevational view, illustrating a further modification in a baking pan assembly embodying the features of this invention.

In the modification illustrated in Figure 4, the body portion 27 is formed with its center extending downwardly to a level considerably below that of the reinforcing wires 19, such as by forming the body portion to V shape or, in the alternative, to an arcuate shape, but with the end portions 28 and 29 extending laterally substantially horizontally from the ends of the body portion to the under side of the reinforcing wires 19 for attachment thereto, as by welding or the like. In this construction, the body portion of the spacer functions to maintain the desired rigid spaced relationship between the adjacent side walls of the pan units, while at the same time extending downwardly in position to be engaged by lugs which are used on commercial baking machines for automatic handling of such elements.

Figure 5:
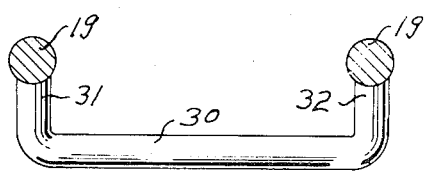
Figures 5 and 6 are sectional elevational views, illustrating still further modifications which may be embodied in the practice of this invention.

In the modification illustrated in Figure 5, the body portion 30 extends crosswise between the pan units, as in the modification illustrated in Figure 3, but at a lower level than the reinforcing wires or the bead 18, and the end portions 31 and 32 extent upwardly substantially perpendicularly from the ends of the body portion 30 into engagement with the under side of the reinforcing wires 19 for attachment thereto, as by welding or by soldering, or by other similar metal-fastening means.

Figure 6:
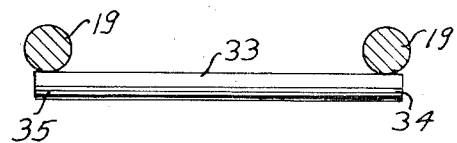

The modification illustrated in Figure 6 comprises a body portion 33 in which the end portions 34 and 35 are formed as a continuation thereof to extend to the under side of the reinforcing wires 19 for attachment thereto by suitable fastening means, with the body portion extending therebetween at a level slightly below the level of the wires.

The various modifications previously described provide means whereby a rigid and permanent attachment is developed between the crosswise extending spacer members and the reinforcing wires in an area beyond the edge of the sheet metal which is turned over about the wires to form the beads 18 so that attachment can be made between the spacers directly with the reinforcing wires without interference with the appearance of the bead.

In the practice of this invention for the manufacture of multiple baking pan assemblies of the type described, it is preferred to make use of more than one spacer between the side walls of adjacent pan units in order to prevent distortions or variations in the spaced relation and in order to hold the pan units to the desired shape. Where the reinforcing elements merely function as bumpers free from attachment to the side walls of the pan units or the reinforcing wires, it has been found possible, during use, to cause the walls of one pan to be drawn away from the other to cause deformations which not only interfere with the appearance of the baked product but might also interfere with the delivery of the baked product from the pan unit upon completion of the baking operation.

The use of spacers of curvilinear cross-section greatly improves the appearance of the pan assembly and the utility thereof, and it has been found markedly to increase the life of the pan and to eliminate areas which would constitute possible sources of contamination of baked goods or deterioration of the pan assembly.

As described in the aforementioned pending application No. 293,286, the bridging members may be attached to the reinforcing wires without welding, as by providing flattened ends extending outwardly from the body portions which can be wrapped from the under side inwardly about the reinforcing wires. By such attachment, it is possible to achieve the assembled relation with the body portion of the spacer embodying the desired characteristics and without providing too great a bulge in the bead formed about the reinforcing wire.

It will be understood that changes may be made in the details of construction, arrangement and operation without departing from the spirit of the invention, especially as defined in the following claims.

I claim:

1. A multiple baking pan assembly comprising a plurality of substantially elongate rectangular baking pans joined together in spaced-apart relation, a reinforcing wire extending continuously all around the upper edge portion of each individual pan unit, the upper edge portion of the pan walls being turned about the wires to form a reinforcing bead, and bridging members separate and apart from the reinforcing wires and beads extending cross-wise between the adjacent side walls of laterally spaced pan units in the portions intermediate the ends thereof, said bridging members being in the form of elongate rod-like members having a body portion of curvilinear cross-section and dimensioned to correspond to the distance between the reinforcing wires in the adjacent side walls of adjacent pan units, and end portions extending outwardly from the ends of the body portion into engagement with the under side of the reinforcing wires and joined, as by welding, thereto, said end portions being flattened for more substantial engagement with the reinforcing wire.

2. A multiple baking pan assembly comprising a plurality of substantially elongate rectangular baking pans joined together in spaced apart relation, a reinforcing wire extending continuously all around the upper edge portions of each pan unit, the upper edge portion of the pan walls being turned about the wires to form a reinforcing bead, and bridging members separate and apart from the reinforcing wires and beads extending crosswise between the adjacent side walls of laterally spaced pan units in the portions intermediate the ends thereof, said bridging members being in the form of elongate rod-like members having a body portion of curvilinear cross-section and dimensioned to correspond to the distance between the reinforcing wires in the adjacent side walls of adjacent pan units, and in which the body portion is of V shape with the central portion thereof at a lower level than the ends thereof, and end portions extending outwardly substantially horizontally from the body portion into engagement with the underside of the reinforcing wires and secured thereto as by welding.

3. A multiple baking pan assembly comprising a plurality of substantially rectangular baking pan units joined together in spaced apart relation, a reinforcing wire extending continuously all around the upper edge portion of each pan unit, the upper edge portion of the pan walls being turned about the wire to form a reinforced bead, and a bridging member separate and apart from the reinforcing wire and the bead formed thereabout all around the pan joining adjacent pan units intermediate their ends comprising an elongate rod-like member having a body portion of circular cross-section extending perpendicularly between the upper edges of adjacent pans and dimensioned to correspond to the distance between adjacent pan units and flattened portions integral with the ends of the body portion turned about the reinforcing wire on the lower side thereof and terminating short of the adjacent pan wall and secured to the wire as by welding.

References Cited in the file of this patent
UNITED STATES PATENTS

| | | |
|---|---|---|
| 1,149,928 | Lockwood | Aug. 10, 1915 |
| 1,183,524 | Biggs | May 16, 1916 |